(12) United States Patent
Niedzielski

(10) Patent No.: US 9,503,530 B1
(45) Date of Patent: Nov. 22, 2016

(54) PREFERENTIAL LOADING IN DATA CENTERS

(71) Applicant: United Services Automobile Association, San Antonio, TX (US)

(72) Inventor: David Niedzielski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/257,646

(22) Filed: Apr. 21, 2014

Related U.S. Application Data

(63) Continuation of application No. 12/196,275, filed on Aug. 21, 2008, now Pat. No. 8,706,878.

(51) Int. Cl.
G06F 15/173 (2006.01)
H04L 29/08 (2006.01)

(52) U.S. Cl.
CPC .................................. H04L 67/16 (2013.01)

(58) Field of Classification Search
CPC ............. H04L 67/1002; H04L 47/125; H04L 67/1029; H04L 45/22; G06F 17/00; G06F 17/10; G06F 17/30194; G06F 17/30233; G06F 17/30477
USPC .......................................................... 709/238
See application file for complete search history.

(56) References Cited

U.S. PATENT DOCUMENTS

| | | |
|---|---|---|
| 6,377,993 B1 | 4/2002 | Brandt et al. |
| 6,415,323 B1 | 7/2002 | McCanne et al. |
| 6,601,084 B1 | 7/2003 | Bhaskaran et al. |
| 6,816,905 B1 | 11/2004 | Sheets et al. |
| 7,020,132 B1 | 3/2006 | Narasimhan et al. |
| 7,284,055 B1 | 10/2007 | Oehrke et al. |
| 7,600,148 B1 | 10/2009 | Shaw et al. |
| 7,609,619 B2 | 10/2009 | Naseh |
| 7,685,465 B1 | 3/2010 | Shaw et al. |
| 7,710,865 B2 | 5/2010 | Naseh |
| 7,734,787 B2 | 6/2010 | Huff |
| 7,747,898 B1 | 6/2010 | Shaw et al. |

(Continued)

OTHER PUBLICATIONS

U.S. Appl. No. 12/188,188, filed Aug. 7, 2008, entitled "Systems and Methods for Non-Specific Address Routing."

(Continued)

*Primary Examiner* — Phuoc Nguyen
(74) *Attorney, Agent, or Firm* — Eric L. Sophir; Dentons US LLP

(57) ABSTRACT

Infrastructure is disclosed for optimizing performance and minimizing errors during normal operation of replicated data centers. In some implementations, systems that are replicated in each data center under a common IP address may have service requests routed to them using routing tables that favor one of the systems. The routing tables may prefer the system that resides in the data center where the service requests originated, or they may prefer the system that meets other criteria. Other systems replicated in the data center may have service requests routed to them using configuration tables that favor one of the systems. The configuration tables may also prefer the system that resides in the data center where the service requests originated, or they may prefer the system that meets other criteria. This arrangement helps optimize performance during normal operation and minimize potential for disruption of service should one of the data centers fail.

23 Claims, 6 Drawing Sheets

(56) References Cited

U.S. PATENT DOCUMENTS

| | | |
|---|---|---|
| 7,769,886 B2 | 8/2010 | Naseh |
| 8,166,197 B2 | 4/2012 | Hoynowski et al. |
| 8,171,111 B1 | 5/2012 | Niedzielski et al. |
| 8,243,589 B1 | 8/2012 | Trost et al. |
| 2001/0049741 A1 | 12/2001 | Skene et al. |
| 2002/0107977 A1 | 8/2002 | Dunshea et al. |
| 2002/0194324 A1 | 12/2002 | Guha |
| 2003/0009707 A1 | 1/2003 | Pedone et al. |
| 2003/0126265 A1* | 7/2003 | Aziz et al. ............ 709/227 |
| 2003/0220990 A1* | 11/2003 | Narayanan et al. ......... 709/220 |
| 2006/0036761 A1 | 2/2006 | Amra et al. |
| 2006/0193247 A1 | 8/2006 | Naseh et al. |
| 2006/0193252 A1 | 8/2006 | Naseh et al. |
| 2006/0195607 A1 | 8/2006 | Naseh et al. |
| 2008/0043622 A1* | 2/2008 | Kamath et al. ............ 370/235 |
| 2009/0259768 A1* | 10/2009 | McGrath et al. ............ 709/241 |
| 2011/0231888 A1 | 9/2011 | Sequeira |

OTHER PUBLICATIONS

U.S. Appl. No. 12/188,190, filed Aug. 7, 2008, entitled "Systems and Methods for Non-Specific Address Routing."

U.S. Appl. No. 12/191,979, filed Aug. 14, 2008, entitled "Systems and Methods for Data Center Load Balancing."

U.S. Appl. No. 12/191,985, filed Aug. 14, 2008, entitled "Systems and Methods for Data Center Load Balancing."

U.S. Appl. No. 12/196,276, filed Aug. 21, 2008, entitled "Preferential Loading in Data Centers."

U.S. Appl. No. 12/196,277, filed Aug. 21, 2008, entitled "Preferential Loading in Data Centers."

* cited by examiner

PREFERENTIAL LOADING IN DATA CENTERS

CROSS REFERENCE TO RELATED APPLICATIONS

This application is a continuation of U.S. patent application Ser. No. 12/196,275, filed Aug. 21, 2008, entitled "Preferential Loading In Data Centers," which is hereby incorporated by reference in its entirety. This application is related to U.S. patent application Ser. No. 12/196,276, filed Aug. 21, 2008, entitled "Preferential Loading In Data Centers," and U.S. patent application Ser. No. 12/196,277, filed Aug. 21, 2008, entitled "Preferential Loading In Data Centers," both of which are hereby incorporated herein by reference in their entirety.

This application is related in subject matter to, and incorporates herein by reference in its entirety, each of the following: U.S. application Ser. No. 12/196,276 entitled "PREFERENTIAL LOADING IN DATA CENTERS,", filed Aug. 21, 2008, now abandoned; and U.S. application Ser. No. 12/196,277 entitled "PREFERENTIAL LOADING IN DATA CENTERS," filed Aug. 21, 2008, now abandoned.

This application is related in subject matter to, and incorporates herein by reference in its entirety, each of the following U.S. patent applications: application Ser. No. 11/533,248 entitled HIGH-AVAILABILITY DATA CENTER, filed Sep. 19, 2006, now U.S. Pat. No. 7,685,465; application Ser. No. 11/533,262 entitled HIGH-AVAILABILITY DATA CENTER, filed Sep. 19, 2006, now U.S. Pat. No. 7,680,148; and application Ser. No. 11/533,272 entitled HIGH-AVAILABILITY DATA CENTER, filed Sep. 19, 2006, now U.S. Pat. No. 7,747,898.

This application is further related in subject matter to, and incorporates herein by reference in its entirety, each of the following U.S. patent applications: application Ser. No. 12/188,187 entitled "SYSTEMS AND METHODS FOR NON-SPECIFIC ADDRESS ROUTING", filed Aug. 7, 2008 now U.S. Pat. No. 8,171,111; application Ser. No. 12/188,188 entitled "SYSTEMS AND METHODS FOR NON-SPECIFIC ADDRESS ROUTING", filed Aug. 7, 2008, now abandoned; and application Ser. No. 12/188,190 entitled "SYSTEMS AND METHODS FOR NON-SPECIFIC ADDRESS ROUTING", filed Aug. 7, 2008, now abandoned.

This application is further related in subject matter to, and incorporates herein by reference in its entirety, each of the following U.S. patent applications: application Ser. No. 12/191,979 entitled "SYSTEMS AND METHODS FOR DATA CENTER LOAD BALANCING", filed Aug. 14, 2008, now abandoned; application Ser. No. 12/191,985 entitled "SYSTEMS AND METHODS FOR DATA CENTER LOAD BALANCING", filed Aug. 14, 2008, now abandoned; and application Ser. No. 12/191,993 entitled "SYSTEMS AND METHODS FOR DATA CENTER LOAD BALANCING", filed Aug. 14, 2008, now U.S. Pat. No. 8,243,589.

This application is further related in subject matter to, and incorporates herein by reference in its entirety, each of the following U.S. patent applications: application Ser. No. 11/065,871 entitled "DISASTER REVOVERY FOR ACTIVE-STANDBY DATA CENTER USING ROUTE HEALTH AND BGP" (Published Application No. US20060193247); application Ser. No. 11/066,955 entitled "APPLICATION BASED ACTIVE-ACTIVE DATA CENTER NETWORK USING ROUTE HEALTH INJECTION AND IGP" (Published Application US20060195607), and Application Ser. No. 11/067,037 entitled "ACTIVE-ACTIVE DATA CENTER USING RHI, BGP, AND IGP ANYCAST FOR DISASTER RECOVERY AND LOAD DISTRIBUTION" (Published Application No. US20060193252).

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Embodiments disclosed and taught herein relate generally to data centers and, more specifically, to methods and systems for containing a load within a data center.

A data center, in general, is a physical location or facility that houses computing systems for a particular business, industry, governmental entity, or other organization. The computing systems may include, for example, one or more server cells or clusters that perform various functions for the organization. Examples of such functions may include Web site hosting, information storing, business processing, and the like. Other computing systems may also be housed in the data center for performing still other functions. Clients may then access the organization, typically via the Internet for external clients and an intranet for internal clients, to obtain services from the data center.

When one or more computing systems or the entire data center fails or becomes unavailable, service may be disrupted, and the organization's image or brand may suffer. Therefore, many organizations provide redundant computing systems in a second data center that is connected to the first data center over a high-speed network. The second data center typically operates simultaneously with the first data center such that clients may obtain the same services through either data center. The particular data center a client may be assigned to upon accessing the organization may follow a random, round robin, or other suitable process. Thereafter, if one or more computing systems in one data center is unavailable, the client may be automatically redirected to computing systems in the other data center (i.e., a failover situation). This "always-on" or high-availability approach allows the organization to maintain substantially continuous and uninterrupted service to clients.

But simply having multiple data centers may not be sufficient if there are performance issues with the data centers. For example, data centers are typically located far enough away from one another so that a catastrophic event (e.g., fire, explosion, chemical spill, etc.) at one data center does not take down another data center. However, this physical separation may also introduce unnecessary latency, for example, when a client initially assigned to one data center is routed to another data center for service during normal operation (i.e., a non-failover situation). Such routing of service between data centers may additionally increase the potential for disruption of service should either data centers fail relative to routing that is confined to one data center.

Accordingly, what is needed is a way to provide services to clients that optimizes performance during normal operation of the data centers and minimizes potential for disruption of service should one of the data centers fail. More specifically, what is needed is a way to minimize the probability that a client assigned to one data center is unnecessarily routed to another data center for service during normal operation.

SUMMARY

The disclosed embodiments are directed to an autonomous intranet system for minimizing the probability that a client assigned to one data center is needlessly routed to another data center for service during normal operation. In some implementations, systems that are replicated in each data center under a common IP address may have service requests routed to them using routing tables that favor one of the systems over another. The routing tables may be designed to favor the system that resides in the data center where the service requests were received, or they may be designed to favor the system that meets some other criteria. Other systems replicated in the data center may have service requests routed to them using configuration tables that favor one of the systems over another. The configuration tables may again be more favorable to the system that resides in the data center where the service requests were received, or they may be more favorable to the system that meets some other criteria. This arrangement, which is sometimes referred to as a "stovepipe" arrangement, helps optimize performance of the data centers during normal operation and minimize potential for disruption of service should one of the data centers fail.

BRIEF DESCRIPTION OF THE DRAWINGS

The foregoing and other advantages of the disclosed embodiments will become apparent from the following detailed description and upon reference to the drawings, wherein.

DETAILED DESCRIPTION

Figure 1:
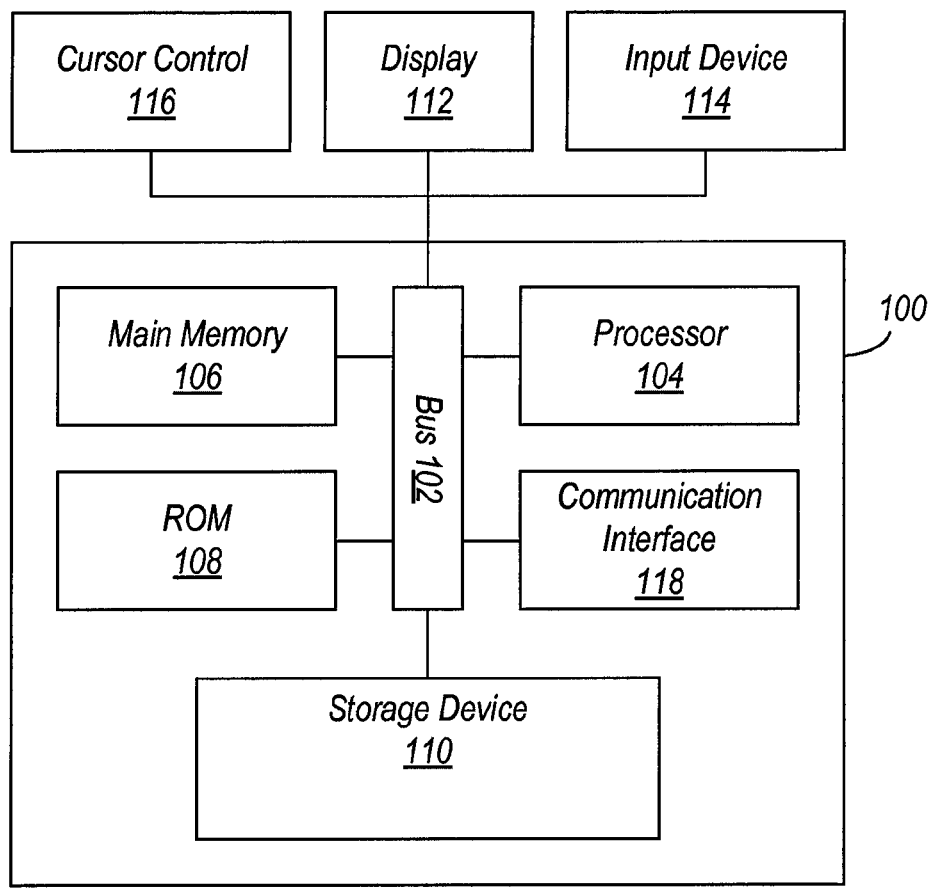
FIG. 1 illustrates an exemplary computing system that may be used to implement various aspects of the autonomous intranet system of the disclosed embodiments.

The figures described above and the written description of specific structures and functions provided herein are not presented to limit the scope of what Applicants have invented or the scope of the appended claims. Rather, the figures and written description are provided to teach any person skilled in the art to make and use that for which patent protection is sought. Those skilled in the art will appreciate that not all features of a commercial embodiment are described or shown for the sake of clarity and understanding. Persons of skill in the art will also appreciate that the development of an actual commercial embodiment incorporating various aspects of this disclosure may require numerous implementation-specific decisions to achieve the developer's ultimate goal for the commercial embodiment. Such implementation-specific decisions may include, and likely are not limited to, compliance with system-related, business-related, government-related standards and other constraints, which may vary over time by location and specific implementation. While a developer's efforts might be complex and time-consuming in an absolute sense, such efforts would be, nevertheless, a routine undertaking for those of skill in this art having benefit of this disclosure. It must be understood that the embodiments disclosed and taught herein are susceptible to numerous and various modifications and alternative forms. Also, the use of a singular term, such as, but not limited to, "a," is not intended as limiting of the number of items. Furthermore, the use of relational terms, such as, but not limited to, "top," "bottom," "left," "right," "upper," "lower," "down," "up," "side," and the like are used in the written description for clarity in specific reference (e.g., to the figures) and are not intended to limit the scope of embodiments or the appended claims.

Particular embodiments may be described below with reference to block diagrams and/or operational illustrations of methods. It will be understood that each block of the block diagrams and/or operational illustrations, and combinations of blocks in the block diagrams and/or operational illustrations, may be implemented by analog and/or digital hardware, and/or computer program instructions. Such computer program instructions may be provided to a processor of a general-purpose computer, special purpose computer, ASIC (application specific integrated circuit), and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

As mentioned above, the disclosed embodiments provide high-availability data centers that minimize the probability of a client assigned to one data center being unnecessarily routed to another data center for service during normal operation. In general, the data centers of the disclosed embodiments implement a "stovepipe" philosophy in which processing activity related to fulfillment of a given service request are deliberately and specifically confined to a single data center unless required otherwise. Services that may be affected may include any service provided by the data centers, including, for example, banking services (e.g., a deposit, a withdrawal, etc.), insurance services (e.g., a premium quotation, a coverage change, etc.) and, investment services (e.g., a stock purchase, a stock sale, etc.), and the like In accordance with the disclosed embodiments, where a service request may be fulfilled by more than one data center, a preference may be provided for fulfilling the service request in the data center that originally received the service request. This confinement to one data center may help optimize performance for each data center during normal operation by minimizing latency to the extent the data centers are geographically separated. The confinement may also reduce the likelihood of service disruption should one of the data centers fail (i.e., compared to a service request that is being processed in more than one data center). As used herein, "service disruption" refers to any actual or perceived disruption in the service being requested, whether by a person or an application, and may include, for example, a dropped connection, a "page not found" error, slow or sluggish responses, and the like.

In one embodiment, systems and/or resources that are replicated in each data center under a common IP address may have service requests routed to them using routing tables that prefer one of the systems and/or resources over another. For example, the routing tables may prefer the system and/or resource that resides in the "local" data center, which is the data center where the service requests originated. Alternatively, the routing tables may prefer the system and/or resource that meets some other criteria, such as the one that is topographically closest, has the fastest processing capability, and the like. For systems and/or resources that are replicated in the data centers under different IP addresses, service requests may be routed using configuration tables that favor one of the systems and/or resources over another. As with the routing tables, the configuration tables may be more favorable to the system and/or resource that resides in the "local" data center, or they may be more favorable to the system and/or resource that meets some other criteria. In general, the system and/or resource that provides optimal performance based on one or more criteria, such as minimizing latency, failure potential, and the like, may be preferred in accordance with the disclosed embodiments. While this system and/or resource is typically the one that resides in the "local" data center, those having ordinary skill in the art will understand that the disclosed embodiments are not so limited.

Referring now to FIG. 1, a computing system 100 is shown that may be used to implement various aspects of the high-availability data centers according to the disclosed embodiment. Such a computing system 100 may be a server, workstation, mainframe, and the like. As can be seen, the computing system 100 typically includes a bus 102 or other communication mechanism for communicating information and a processor 104 coupled with the bus 102 for processing information. The computing system 100 may also include a main memory 106, such as a random access memory (RAM) or other dynamic storage device, coupled to the bus 102 for storing computer-readable instructions to be executed by the processor 104. The main memory 106 may also be used for storing temporary variables or other intermediate information during execution of the instructions to be executed by the processor 104. The computing system 100 may further include a read-only memory (ROM) 108 or other static storage device coupled to the bus 102 for storing static information and instructions for the processor 104. A non-volatile computer-readable storage device 110, such as a magnetic, optical, or solid state device, may be coupled to the bus 102 for storing information and instructions for the processor 104.

The computing system 100 may be coupled via the bus 102 to a display 112, such as a cathode ray tube (CRT) or liquid crystal display (LCD), for displaying information to a user. An input device 114, including, for example, a keyboard having alphanumeric and other keys, may be coupled to the bus 102 for communicating information and command selections to the processor 104. Another type of user input device may be a cursor control 116, such as a mouse, a trackball, or cursor direction keys for communicating direction information and command selections to the processor 104, and for controlling cursor movement on the display 112. The cursor control 116 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 104 and/or other components. Similarly, the term "computer-readable medium" refers to any storage medium that may be used to store the computer-readable instructions. Such a medium may take many forms, including, but not limited to, non-volatile media, volatile media, and transmission media. Transmission media may include coaxial cables, copper wire and fiber optics, including wires of the bus 102, while transmission may take the form of acoustic, light, or electromagnetic waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The computing system 100 may also include a communication interface 118 coupled to the bus 102. The communication interface 118 typically provides a two way data communication coupling between the computing system 100 and a network. For example, the communication interface 118 may be an integrated services digital network (ISDN) card or a modem used to provide a data communication connection to a corresponding type of telephone line. As another example, the communication interface 118 may be a local area network (LAN) card used to provide a data communication connection to a compatible LAN. Wireless links may also be implemented. Regardless of the specific implementation, the main function of the communication interface 118 is to send and receive electrical, electromagnetic, optical, or other signals that carry digital data streams representing various types of information.

Figure 2:
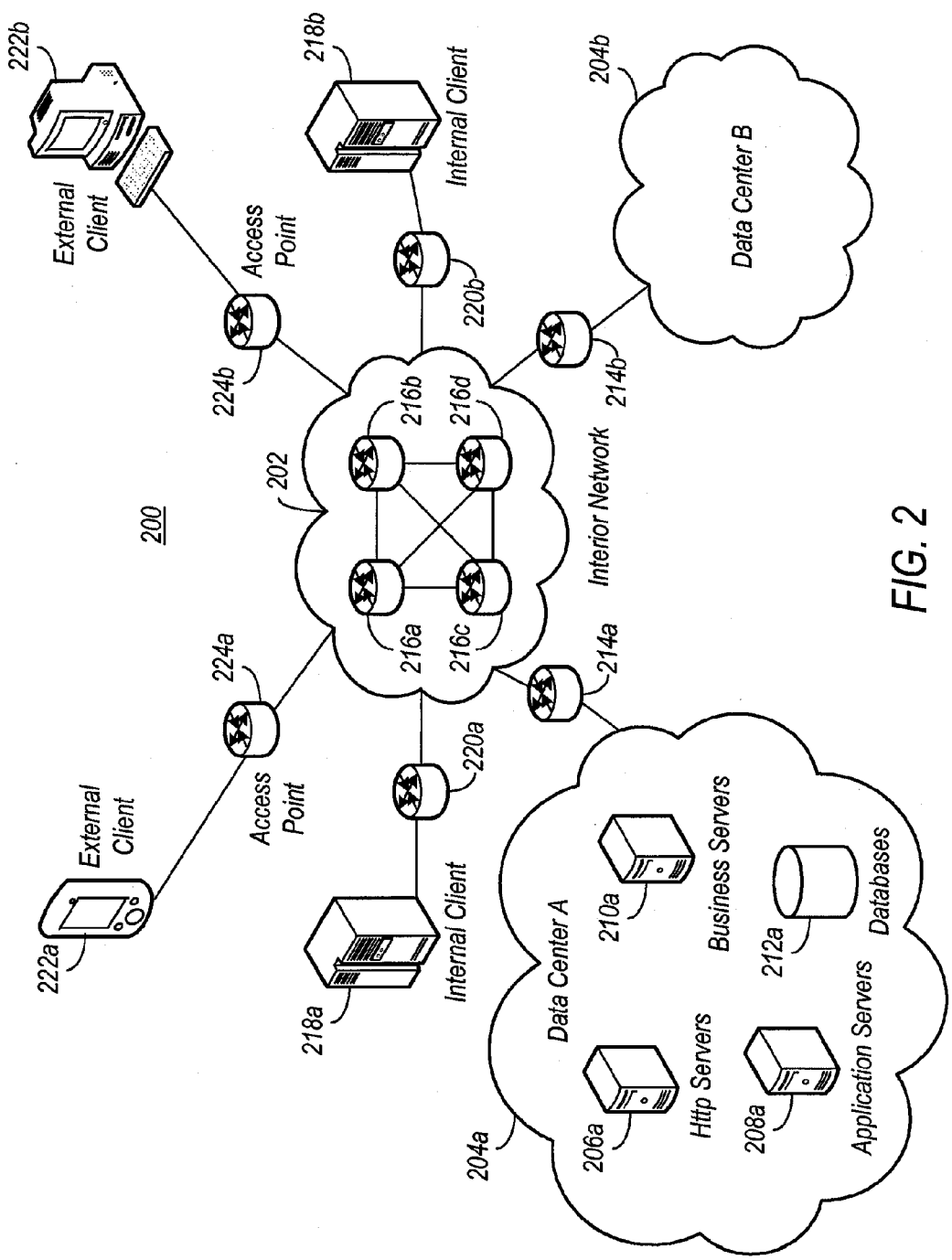
FIG. 2 illustrates an exemplary autonomous intranet system for providing preferential loading in multiple data centers according to disclosed embodiments.

Referring now to FIG. 2, the computing system 100 described above may be used to implement various aspects of an autonomous intranet system 200 according the disclosed embodiments. An autonomous intranet system, in general, is a network or collection of networks under the control of a single organization, for example, where the organization sets the routing policy for the autonomous intranet system 200. The autonomous intranet system 200 may include an interior network 202, such as an Interior Gateway Protocol (IGP) network or other suitable network, to which data centers 204a and 204b (e.g., Data Center A and Data Center B, respectively) may be connected.

Each data center 204a and 204b may be a fully active and redundant version of the other data center 204b and 204a so that a given service request may be fulfilled by either data center 204a and 204b. Referring to Data Center A, each data center 204a and 204b may include a number of computing systems and/or resources, such as http (hypertext transfer protocol) servers 206a, application servers 208a, business servers 210a, and databases 212a. In general, the http servers 206a manage static content (e.g., graphics, images, etc.) on the organization's Web site, the application servers 208a receive and process Web service requests, the business servers 210a fulfill the service requests, and the databases 212a store data and information used by the organization. Data Center B may include the same or similar counterpart systems and/or resources (not expressly shown). These computing systems and/or resources are typically organized as cells or clusters in which multiple servers operate as a single virtual unit. Other types of computing systems and/or resources in addition to or instead of those mentioned above, such as file servers, email servers, print servers, and the like, may also be present in the data centers 204a and 204b.

Routers, some of which are shown at 214a and 214b, may be provided to route network traffic to/from the data centers 204a and 204b from/to the interior network 202. Within the interior network 202, additional routers may be provided, some of which are shown at 216a & 216c and 216b & 216d, to route the network traffic to/from its intended destination.

Various clients may then connect to the interior network 202 to obtain services from the data centers 204a and 204b. For example, internal clients 218a and 218b, which may be employees of the organization, may connect to the interior network 202 via routers 220a and 220b, respectively, to obtain services from the data centers 204a and 204b. Similarly, external clients 222a and 222b, which may be customers of the organization, may connect to the interior network 202 via access points 224a and 224b, respectively, to obtain services from the data centers 204a and 204b. The external clients 222a and 222b may be routed to the access points 224a and 224b over the Internet, for example, via a Border Gateway Protocol (BGP) or other suitable protocols known to those having ordinary skill in the art and lead of the disclosure here in.

When a request for service from either the internal clients 218a and 218b or the external clients 222a and 222b arrives at the interior network 202, the service request is routed to one of the data centers 204a and 204b. The particular data center 204a and 204b that the service request is routed to may be selected using a random, round robin, or other suitable process known to those having ordinary skill in the art. In accordance with the disclosed embodiments, the autonomous intranet system 200 may be designed such that whichever data center 204a or 204b receives the service request, that data center 204a or 204b performs the activities related to fulfilling the service request unless there is a failover or similar event requiring routing to the other data center 204a or 204b.

Figure 3:
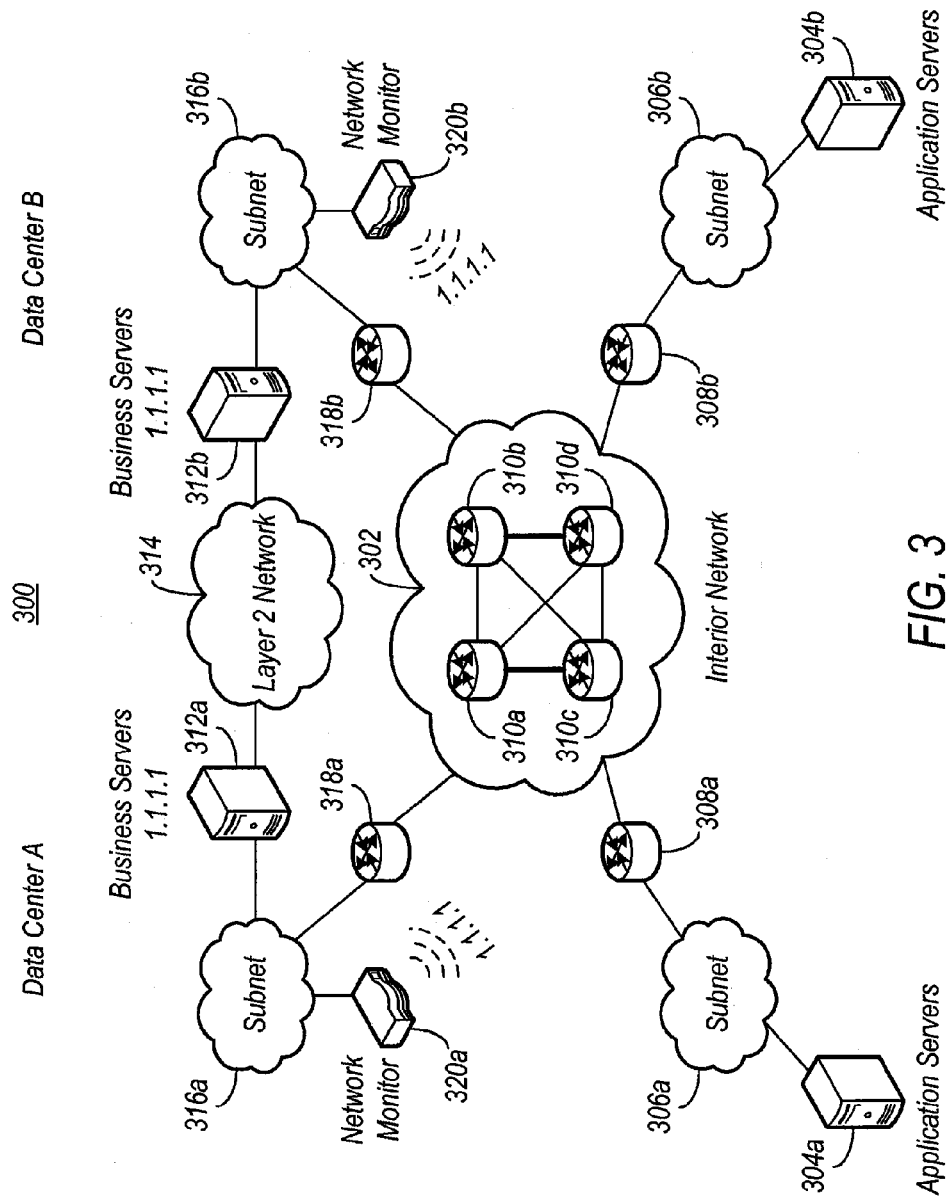
FIG. 3 illustrates an exemplary autonomous intranet system for providing preferential loading of business servers according to disclosed embodiments.

A specific example of the above "stovepipe" arrangement is illustrated in FIG. 3 where portions of exemplary data centers, Data Center A and Data Center B, are shown in more detail. As can be seen, an autonomous intranet system 300 may include an interior network 302 similar to the interior network 202 (see FIG. 2) to which application servers 304a of Data Center A may connect via a local subnet 306a and a router 308a. Application servers 304b of Data Center B may similarly connect to the interior network 302 via a local subnet 306b and a router 308b. Routers 310a & 310c and 310b & 310d within the interior network 302 route network traffic from the application servers to business servers 312a and 312b in each of the Data Centers A and B, respectively.

The particular business servers 312a and 312b shown in this example are database servers for "active-active" databases (not expressly shown) in each of the Data Centers A and B. Such "active-active" databases update changes in each other in real time across the Data Centers A and B. Examples of databases that may be "active-active" include customer relation management (CRM) databases that store customer-related information for the organization. A Layer 2 network 314 (see Open Systems Interconnection (051) model) may be used to provide high-speed connectivity between the databases, as compared to a Layer 3 or higher network, which requires processing that can delay network traffic between the databases. Local subnets 316a and 316b and routers 318a and 318b connect the business servers 312a and 312b to the interior network 302. Note that the subnets 306a and 316a in Data Center A may be the same subnet in some embodiments, or they may be different subnets. A similar situation may exist for the subnets 306b and 316b in Data Center B.

In an "active-active" database arrangement, both databases are immediately updated whenever there is a change in either database so that they are effectively a single database. As such, the business servers 312a and 312b that access these databases may be advertised on the interior network 302 under a common IP address (e.g., 1.1.1.1). This allows service requests that are sent to the common IP address to be fulfilled by either of the business servers 312a and 312b. Network monitors 320a and 320b may then be provided to check the status of the business servers 312a and 312b and advertise their availability (or lack thereof) to the interior network 302. The network monitors 320a and 320b may be, for example, Layer 4 router switches available from F5 Networks, Inc. of Seattle, Wash., that have a Route Health Injection (RHI) feature.

In accordance with the disclosed embodiments, the routers 310a & 310c and 310b & 310d of the interior network 302 may be provided with routing tables that have preferential routing for the business servers 312a and 312b. Routing tables are well known to those having ordinary skill in the art and will not be described in detail here. Suffice it to say, the preferential routing may be implemented in the form of a weight applied to one or more routes that a service request to the business servers 312a and 312b may traverse from the routers 310a & 310c and 310b & 310d. In some embodiments, the routing tables may have a higher preference for routes that send the service request to a business server 312a and 312b within a local Data Center A or B, whereas routes that send the service request to a business server 312a and 312b outside the local Data Center A or B may have a lower preference. This is illustrated in FIG. 3 via the relatively thicker lines between the routers 310a and 310c of Data Center A and similar lines between the routers 310b and 310d of Data Center B.

Alternatively, the routing tables of the routers 310a & 310c and 310b & 310d may prefer a business server 312a and 312b that meets one or more other criteria, such as the one that is topographically nearest (e.g. according to the Open Shortest Path First, (OSPF) protocol), has the fastest processing capability, and the like.

Figure 4:
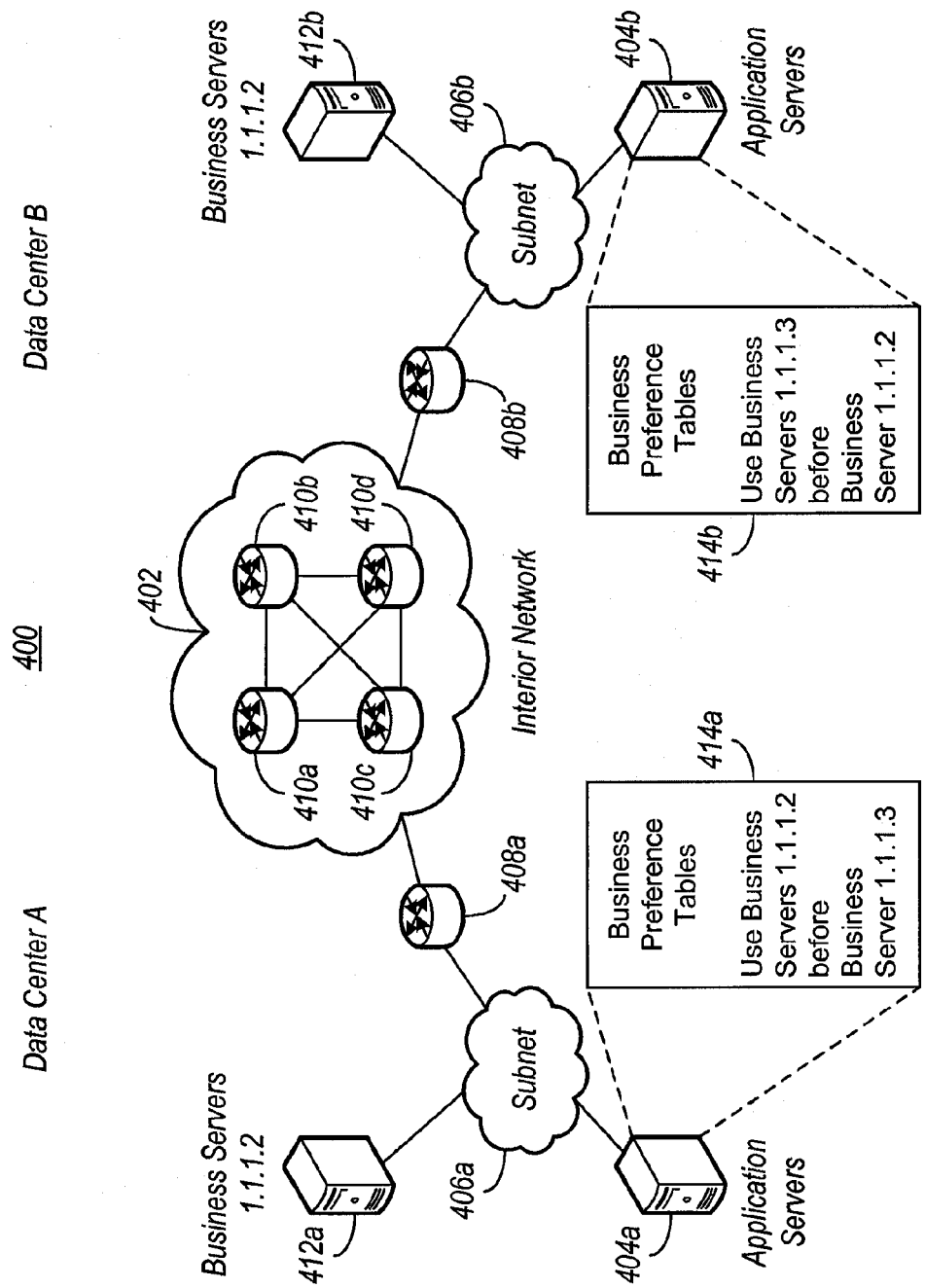
FIG. 4 illustrates another exemplary autonomous intranet system for providing preferential loading of business servers according to disclosed embodiments.

FIG. 4 illustrates another example of the "stovepipe" philosophy of the disclosed embodiments. In FIG. 4, an autonomous intranet system 400 may include an interior network 402 similar to the interior network 202 (see FIG. 2) to which application servers 404a of one data center, Data Center A, may connect via a local subnet 406a and a router 408a. Application servers 404b of another data center, Data Center B, may similarly connect to the interior network 402 via a local subnet 406b and a router 408b. Routers 410a & 410c and 410b & 410d within the interior network 402 route network traffic from the application servers 404a and 404b to business servers 412a and 412b in each of the Data Centers A and B, respectively.

In accordance with the disclosed embodiments, the application servers 404a and 404b may have a persistent affinity for one of the business servers 412a and 412b upon receiving a service request for one of the business servers 412a and 412b, as described below.

The particular business servers 412a and 412b shown here may be backend servers for one of the organization's lines of business, such as its banking business, insurance business, investment business, credit card business, and the like. As in the example of FIG. 3, a request for service may be fulfilled by either of the business servers 412a and 412b. Unlike the example of FIG. 3, however, the business servers 412a and 412b have may different IP addresses. Therefore it is possible to direct the service request to a specific one of the business servers 412a and 412b. To this end, configuration tables for the business servers 412a and 412b may be provided in the application servers 404a and 404b, respectively, that have a persistent affinity for one of the business servers 412a and 412b. Configuration tables are well known to those having ordinary skill in the art and will not be described in detail here. The persistent affinity may then be implemented in the form of a listing that causes the application servers 404a and 404b to send the service request to a particular one of the business servers 412a and 412b before sending the request to the other one.

In some embodiments, the persistent affinity of the application servers 404a and 404b may be for the particular business server 412a and 412b within a local Data Center A or B. If the business server 412a or 412b within a local Data Center A or B is not available, then the application servers 404a and 404b may try the business server 412a or 412b outside the local Data Center A or B. Alternatively, the configuration tables of the application servers 404a and 404b may hold an affinity for a business server 412a or 412b that meets some other criteria, such as the one that is topographically nearest, has the fastest processing capability, and the like.

Figure 5:
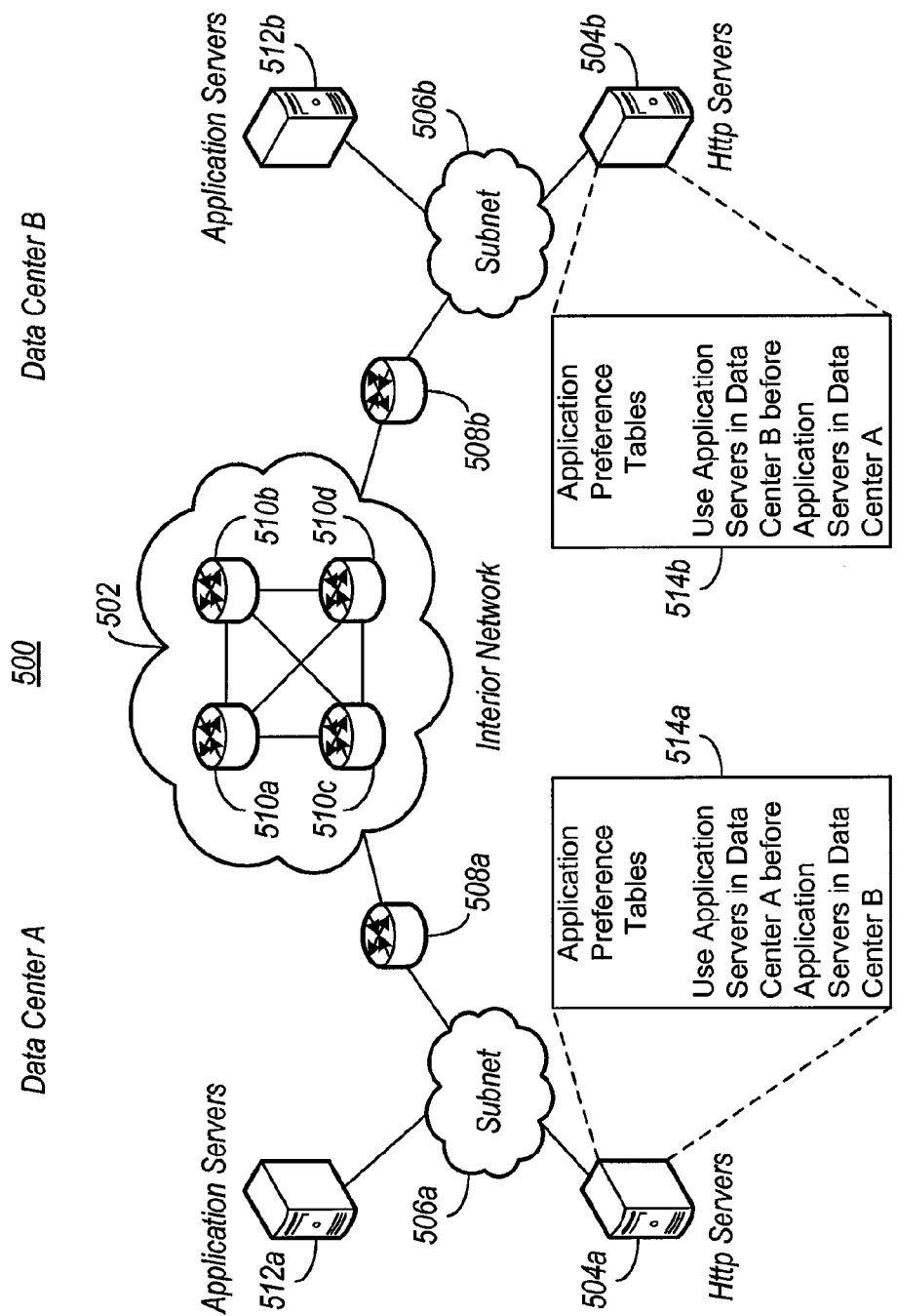
FIG. 5 illustrates an exemplary autonomous intranet system for providing preferential loading of application servers according to disclosed embodiments.

FIG. 5 illustrates yet another example of the "stovepipe" philosophy of the disclosed embodiments. In FIG. 5, an autonomous intranet system 500 may include an interior network 502 similar to the interior network 202 (see FIG. 2) to which http servers 504a of one data center, Data Center A, may connect via a local subnet 506a and a router 508a. Http servers 504b of another data center, Data Center B, may similarly connect to the interior network 502 via a local subnet 506b and a router 508b. Routers 510a & 510c and 510b & 510d within the interior network 502 route network traffic from the http servers 504a and 504b to application servers 512a and 512b in each of the Data Centers A and B, respectively.

In accordance with the disclosed embodiments, the http servers 504a and 504b may have a persistent affinity for one of the application servers 512a and 512b upon receiving a service request that needs to be forwarded to the application servers 512a or 512b. To this end, configuration tables for the application servers 512a and 512b may be provided in the http servers 504a and 504b, respectively, that cause the http servers 504a and 504b to send the service request to a particular one of the application servers 512a and 512b before sending the request to the other one.

In some embodiments, the persistent affinity of the http servers 504a and 504b may be for the particular application server 512a or 512b within a local Data Center A or B. If the application server 512a and 512b within a local Data Center A or B is not available, then the http servers 504a and 504b may try the application server 512a and 512b outside the local Data Center A or B. Alternatively, the configuration tables of the http servers 504a and 504b may have an affinity for a application server 512a and 512b that meets some other criteria, such as the one that is topographically nearest, has the fastest processing capability, and the like.

Figure 6:
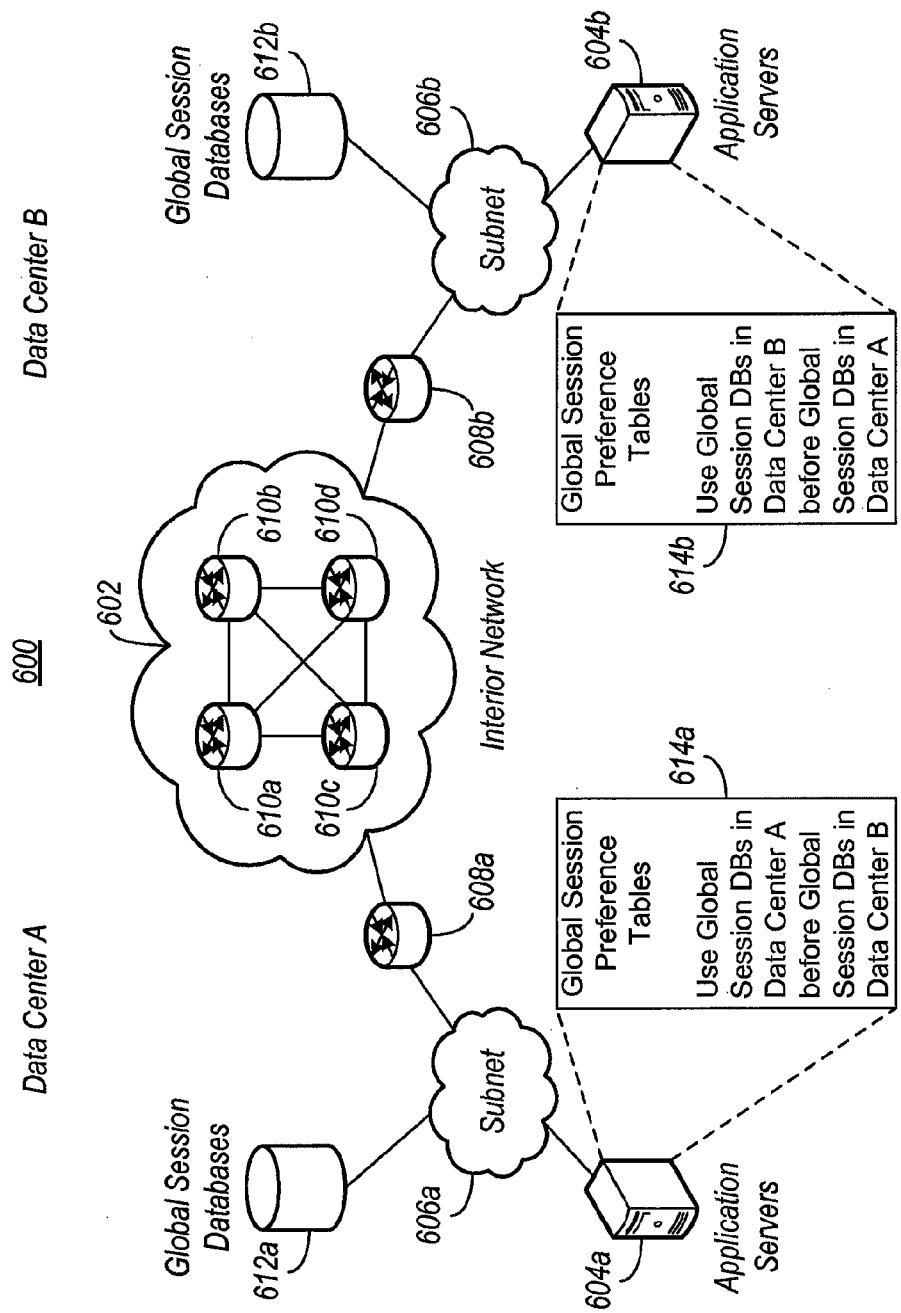
FIG. 6 illustrates an exemplary autonomous intranet system for providing preferential loading of global session databases according to disclosed embodiments.

FIG. 6 illustrates still another example of the "stovepipe" philosophy of the disclosed embodiments. In FIG. 6, an autonomous intranet system 600 may include an interior network 602 similar to the interior network 202 (see FIG. 2) to which application servers 604a of one data center, Data Center A, may connect via a local subnet 606a and a router 608a. Application servers 604b of another data center, Data Center B, may similarly connect to the interior network 602 via a local subnet 606b and a router 608b. Routers 610a & 610c and 610b & 610d within the interior network 602 route network traffic from the application servers 604a and 604b to global session databases 612a and 612b in each of the Data Centers A and B, respectively.

The global session databases 612a and 612b basically store administrative information about a person's access session when the person accesses the organization's Web site. Such information may include, for example, the username, identity, and other security credentials of the person. Such information allows a person to navigate various areas of the Web site without having to reenter his/her security credentials at each area. The information may also track which Web pages the person visited on the Web site, the person's activities on the Web site, and the like.

In accordance with the disclosed embodiments, the application servers 604a and 604b may have a persistent affinity for one of the global session databases 612a and 612b upon opening of a new session that needs to be stored to the global session databases 612a and 612b. To this end, configuration tables for the global session databases 612a and 612b may be provided in the application servers 604a and 604b, respectively, that causes the application servers 604a and 604b to store the session to a particular one of the global session databases 612a and 612b before sending the request to the other one.

In some embodiments, the persistent affinity of the application servers 604a and 604b may be for the particular global session database 612a or 612b within a local Data Center A or B. If the global session database 612a or 612b within a local Data Center A or B is not available, then the application servers 604a or 604b may try the global session database 612a or 612b outside the local Data Center A or B. Alternatively, the configuration tables of the application servers 604a and 604b may have an affinity for a global session database 612a and 612b that meets one or more other criteria, such as the one that is topographically nearest, has the fastest processing capability, and the like.

Although specific embodiments have been illustrated and described herein, those of ordinary skill in the art will appreciate that an arrangement calculated to achieve the same results may be substituted for the specific embodiments disclosed. This disclosure is intended to cover adaptations or variations of various embodiments. It is to be understood that the above description has been made in an illustrative fashion, and not a restrictive one. Combination of the above embodiments, and other embodiments not specifically described herein, will be apparent to those of skill in the art upon reviewing the description herein. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

Furthermore, various features in the foregoing are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter may also be found in less than all features of a single disclosed embodiment. Thus, the following claims are hereby incorporated into the Detailed Description, with each claim standing on its own as a separate embodiment.

What is claimed is:

1. A computer-implemented method of hosting a software application providing a service in a system comprising data centers, the method comprising:
  receiving, by a router of a system, a request for a service provided by two or more servers in the system that are associated with an IP address, the system comprising a plurality of data centers containing at least one server of the two or more servers;
  identifying, by the router, in the two or more servers a first server having the IP address to fulfill the request;
  transmitting, by the router, the request for the service to the first server residing in a first data center, wherein the first server fulfills at least a portion of the request for the service; and
  transmitting, by the router, data associated with the request for the service to a second server residing in the first data center in accordance with a configuration table stored in a memory of the first server.

2. The method according to claim 1, wherein the request for the service is received from an application server.

3. The method according to claim 1, wherein the request for the service is received from a client computing device.

4. The method according to claim 1, further comprising polling, by the router, one or more network monitor devices to determine an availability of the first server.

5. The method according to claim 1, automatically redirecting, by the router, the request for the service to a second data center comprising a second server having the IP address in response to receiving an unavailability notification regarding the first server from one or more network monitor devices.

6. The method according to claim 1, wherein each of the two or more servers having the IP address hosts a database advertised as having the IP address.

7. The method according to claim 1, further comprising continuously confining, by the router, the fulfillment of the service to the first data center.

8. The method according to claim 7, further comprising:
  receiving, by the router, a notification of unavailability regarding the first data center from a network monitor after the first data center fulfills the at least a portion of the request; and
  automatically redirecting, by the router, a remaining portion of the request to a second data center comprising a second server having the IP address according to the routing table.

9. The method according to claim 1, wherein the router identifies the first server residing the first data center according to a routing table stored in a memory of the router.

10. A distributed computing system comprising:
  one or more data centers, each respective data center comprising:
    at least one processor associated with an IP address performing one or more services for fulfilling one or more requests for the one or more services, and
    a memory storing a configuration table accessible to the at least one processor, wherein the configuration table indicates each of the at least one processor of the respective data center configured to perform the one or more services, indicates the at least one processor of a second data center configured to perform the one or more services; and
  one or more routers coupled to the one or more data centers, each router configured determine a data center having a processor to fulfill a request for a service received from a client computer, transmit the request for the service to the data center having the processor associated with the IP address performing the service, receive data associated with the request from the processor, and transmit data associated with the request to a second processor in the data center in accordance with the configuration table stored in the memory of the data center.

11. The system according to claim 10, further comprising a network monitor device continuously monitoring an availability status of the service in the data center performing the service, and transmitting the availability status to a router in response to request for the availability status.

12. The system according to claim 11, wherein the availability status indicates the data center is available to fulfill the request, and wherein the router forwards the request for the service to the data center comprising the processor associated with the IP address performing the service.

13. The system according to claim 12, wherein the request for the service is fulfilled entirely within the data center.

14. The system according to claim 11, wherein the availability status indicates the data center is unavailable to fulfill the request, and wherein the router automatically redirects the request for the service according to the routing table to a second data center comprising a second processor associated with the IP address performing the service for fulfilling the request.

15. The system according to claim 10, wherein the one or more routers are further configured to determine the data center to fulfill the request using a routing table identifying the data center having the processor associated with the IP address performing the service.

16. A distributed computing system comprising data centers having servers associated with an identical IP address, the system comprising:
  one or more routers configured to transmit a request for a service to one or more data centers comprising one or more servers having an IP address, hosting a database, and configured to perform a service;
  a first data center comprising a first server and a third server associated with an IP address, wherein the first server and the third server are configured to perform a service, and wherein the first server comprises a memory storing a configuration table indicating a plurality of servers of the one or more data centers configured to perform the service;
  a second data center comprising a second server associated with the IP address and configured to perform the service,
  wherein a router directs a request for the service to the first data center received from a computing device, wherein the first server associated with the IP address in the first data center fulfills at least a portion of the request, and wherein the router is further configured to transmit data associated with the request from the first server of the first data center to the second server of the second data center when the third server of the first data center lacks availability, in accordance with the configuration table of the first server.

17. The system according to claim 16, wherein each of the first data center and the second data center further comprise a server hosting a database, and wherein the server hosting the database in the first data center and the server hosting the database in the second data center are further configured to replicate the database upon receiving an update to data associated with the service performed by the one or more servers of the respective data center.

18. The system according to claim 17, wherein the request for the service received from the computing device received by the router is from the first server having the IP address requesting the second server having the IP address to store a replication of the database hosted in the first server.

19. The system according to claim 16, further comprising a network monitor device continuously monitoring an availability status of the first server, and transmitting the status to the router, wherein the availability status indicates whether the first server is available to fulfill the request for the service.

20. The system according to claim 19, wherein the router polls the network monitor device for the availability status of the first server having the IP address.

21. The system according to claim 20, wherein the availability status indicates the first server is available, and wherein the router directs the request for the service to the first server having the IP address.

22. The system according to claim 20, wherein the availability status indicates the first server is unavailable, and wherein the router directs the request for the service to the second server having the IP address in the second data center.

23. The system according to claim 16, wherein the router stores a routing table identifying the one or more data centers comprising the one or more servers having the IP, wherein the router directs the request for the service to the first data center according to the routing table stored in a memory of the router.

* * * * *